United States Patent [19]

Takeuchi et al.

[11] Patent Number: 4,771,999
[45] Date of Patent: Sep. 20, 1988

[54] CLAMPING APPARATUS

[75] Inventors: Hirosato Takeuchi; Osahiko Miyazaki; Yasuo Kazama; Naoya Kurihara, all of Tokyo, Japan

[73] Assignee: Nitto Kohki Co. Ltd., Tokyo, Japan

[21] Appl. No.: 79,412

[22] Filed: Jul. 30, 1987

[30] Foreign Application Priority Data

Sep. 29, 1986 [JP] Japan .................. 61-149090[U]

[51] Int. Cl.4 ............................................. B23Q 3/02
[52] U.S. Cl. ........................... 269/135; 269/285; 269/329; 411/13
[58] Field of Search ............... 269/134–138, 269/329, 285; 411/13

[56] References Cited
U.S. PATENT DOCUMENTS 3,987,699 10/1976 Popenoe .................. 411/13

FOREIGN PATENT DOCUMENTS

| 1294166 | 4/1969 | Fed. Rep. of Germany ...... 269/135 |
| 5342058 | 9/1976 | Japan . |
| 1168183 | 10/1969 | United Kingdom . |
| 1316899 | 5/1973 | United Kingdom . |
| 1419523 | 12/1975 | United Kingdom . |
| 2132516 | 7/1984 | United Kingdom . |

Primary Examiner—Robert C. Watson
Attorney, Agent, or Firm—Nixon & Vanderhye

[57] ABSTRACT

In a clamping apparatus, a pressing member is moved on a base in a vertical and horizontal directions by rotation of a bolt. The bolt is provided with a longitudinal hole open end of which is covered by a window. A rod is placed in the hole so as to fix the inner end thereof to the inner end of the hole. A transparent holding member holding a colored fluid is sandwiched by the open side end of the rod and the window. When a tension stress is developed in the bolt, the open side end is far away from the holding member so that fluid covers the open side end.

6 Claims, 2 Drawing Sheets

CLAMPING APPARATUS

BACKGROUND OF THE INVENTION

This invention relates to a clamping apparatus fixed to the top surface of a bed of a machine tool for clamping a workpiece and, in particular, a clamping apparatus for visually displaying the clamping state of the workpiece.

A conventional clamping apparatus for use in clamping a workpiece over the bed of a machine tool has a base block having an upwardly inclined guide surface and fixed to the top surface of the bed and a pressing member having an inclined slide surface. The pressing member slidably contacts the guide surface of the base block at its slide surface and is movable in the vertical direction relative to the top surface of the bed with its horizontal movement relative to the top surface of the bed. The pressing member has a bolt insertion hole extending in the vertical direction and into which a pressing bolt is inserted. The belt insertion hole also extends in said horizontal direction. The forward end of said pressing bolt inserted into the bolt insertion hole is threadably inserted into the base block. When the pressing bolt is rotated in one direction, it is lowered to move the pressing member downwardly over the guide surface of the base block, while at the same also moving it in a horizontal direction.

With a stopper fixed on the top surface of the bed and one side surface of a workpiece abutted against that stopper, the end face of the pressing member which is moved in said one horizontal direction is abutted against the other side surface of the workpiece at a location oppositely facing the stopper, causing the workpiece to be sandwiched by the pressing member and the stopper to clamp the workpiece between the pressing member and the stopper over the top surface of the bed.

In the aforementioned conventional clamping apparatus, the magnitude of a clamping force loaded on the workpiece can be determined only by the clamping torque magnitude of the pressing bolt which is increased substantially in proportion to an increase in the abutting pressure of the pressing member against the other side surface of the workpiece. If the abutting pressure is too smaller than a predetermined proper value, no adequate clamping of the workpiece will be obtained over the top surface of the bed. If, on the other hand, the aforementioned abutting pressure is greater than the aforementioned proper value, then there is a possibility that the workpiece will be warped or that the threads of the pressing bolt will be broken out. In order to prevent the breakage of the threads of pressing bolts and to machine the workpiece on a conventional clamping apparatus with relatively high accuracy, it is required that the abutting pressure of the pressing member against the workpiece on the clamping apparatus be set at the predetermined proper value at all times. To this end, use has been made of a torque wrench.

Where, even in this case, the workpiece is clamped by a plurality of clamping apparatuses, it is done at once with respect to the plurality of clamping apparatuses through the use of a torque wrench and then it is necessary to ascertain, whether or not the clamping forces of the plural clamping apparatuses are constant, again through the use of a torque wrench.

SUMMARY OF THE INVENTION

It is accordingly the object of this invention to provide a clamping apparatus which enables the abutting pressure of a pressing member against a workpiece to be set at a predetermined proper value at all times even if a special tool, such as a torque wrench, is not employed, and enables the magnitude of the abutting pressure of each of a plurality of clamping apparatuses against a workpiece to be viewed easily even if a plurality of such clamping apparatuses are employed.

The aforementioned object of this invention can be attained by a clamping apparatus which comprises:

a base block fixed to the top surface of a bed of a machine tool;

a pressing member having an end face located in a horizontally facing position relative to the top surface of the bed and provided over the base block so that it is movable toward the top surface of the bed in a direction vertical to the top surface of the bed to vary a relative position of the aforementioned end face in a horizontal direction;

a pressing bolt coupled to the pressing member and having a longitudinally extending insertion hole opened at one end, the aforementioned pressing bolt having the other end threadably inserted into the base block or bed so that it is moved toward the base block or bed when it is rotated in one direction to cause the pressing member to be moved, in the aforementioned vertical direction, toward the base block or bed;

a rod placed within the longitudinally extending insertion hole of the pressing bolt and having its inner end portion fixed to the pressing bolt such that an end of the pressing bolt situated on the open end side of the pressing bolt is relatively moved from the open end side of the pressing bolt toward the inside of the insertion hole due to a tension strain developed in the pressing bolt;

a light transmissive window member fixed to the open end of the longitudinally extending insertion hole of the pressing bolt to cover the open end;

fluid holding means provided within the longitudinally extending insertion hole and directly behind the rear surface of the light transmissive window member and having a fluid which does not pass at least one portion of a light wavelength range, the fluid holding member being adapted to, when the end of the rod situated on the open end side of the bolt is relatively moved from the open end side of the bolt toward the inside of the insertion hole owing to the development of a tension strain of a predetermined value in the pressing bolt, cause a color at the light transmissive window member as viewed from outside to change by the fluid flowed into in a space between the aforementioned end of the rod and the light transmissive window member.

In the clamping apparatus of this invention, when a tension stress which is loaded on the pressing bolt in proportion to the magnitude of a clamping torque of the pressing bolt is increased, the end of the rod located on the open end side of the bolt is relatively moved from the open end side of the pressing bolt into the inside of the longitudinally extending insertion hole of the bolt in the insertion hole of the bolt owing to the development of a tension strain in the pressing bolt resulting from the aforementioned tension stress. As a result, the fluid within the fluid holding means which does not pass a portion of a light wavelength range enters a location between the end of the rod and the light transmissive window member, causing the color of the light transmissive window member as viewed from outside to change by a change in the amount of fluid which is occupied at a location between the end of the rod on the open end side of the bolt and the light transmissive window member.

As set forth in more detail above, the change of the color thus attained indicates that the magnitude of the clamping torque of the pressing bolt has attained a predetermined value and hence the abutting pressure of the pressing member against the workpiece has attained a predetermined value.

Since the pressing bolt is threadably inserted into the associated member, further insertion of the clamping bolt is prevented when the color has changed to a predetermined level. Thus, the magnitude of the clamping torque of the pressing bolt (that is, the abutting pressure of the pressing member against the workpiece), can be set to a predetermined value.

Where a plurality of clamping apparatuses are employed to clamp a workpiece over the bed of the machine tool, all of the corresponding pressing bolts are threadably inserted into the associated member until their color level varies to a predetermined level and then their color levels are ascertained by the eye of the operation on the clamping apparatuses. By so doing, the operator can ascertain, at first sight, whether or not the abutting pressure of each pressing member against the workpiece has attained a predetermined level.

DETAILED DESCRIPTION OF THE PREFERRED EMBODIMENT

The embodiment of this invention will be explained in more detail below with reference to the accompanying drawings.

Figure 1:
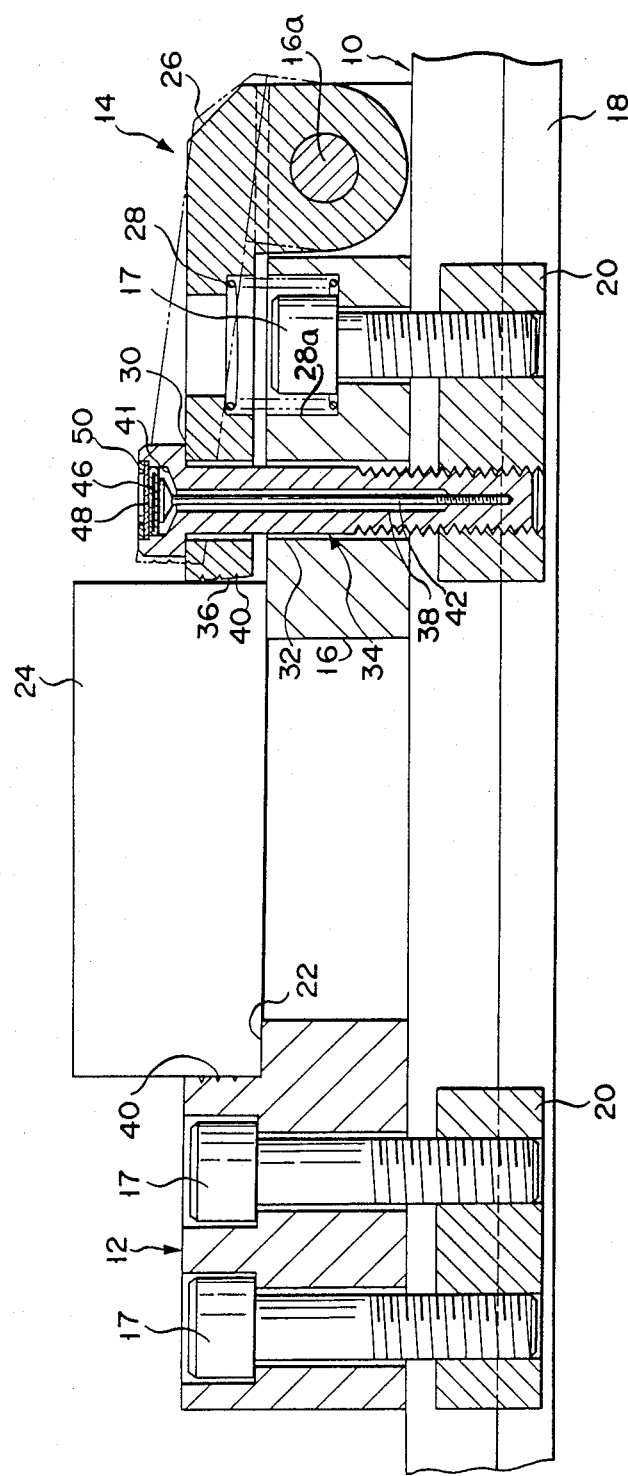
FIG. 1 is a schematic, longitudinal cross-sectional view showing a state in which a clamping apparatus according to an embodiment of this invention clamps a workpiece over a bed of a machine tool.

FIG. 1 shows stopper 12 and base block 16 of clamping apparatus 14 according to the embodiment of this invention both of which are placed on the upper surface of bed 10 of a machine tool. Each of stopper 12 and base block 16 is provided with countersunk insertion holes which extend from the top surface thereof toward the top surface of bed 10. Headed bolt 17 inserted into the insertion hole has its forward end portion threaded into anchoring member 20 of an inverted T-shaped cross section, anchoring member 20 being mounted in an inverted T-shaped groove 18 which is formed at the upper surface of bed 10. The rotation of headed bolt 17 in one direction causes bed 10 to be sandwiched by stopper 12 and base block 16 in cooperation with anchoring member 20 and thus a fixation of stopper 12 and base block 16 at the upper surface of bed 10 is achieved.

Workpiece positioning recess 22 is formed at the upper surface portion of stopper 12 along the side surface thereof situated on the "base block" side. Workpiece 24 is abutted, at its both end portions of the lower surface, against the upper surface of workpiece positioning recess 22 and against the portion of the upper surface of base block 16 located along a side surface opposing to the stopper. Furthermore, workpiece 24 is also abutted, at its lower end portion of the side surface situated on the "stopper" side, against the side surface of workpiece positioning recess 22.

Clamping apparatus 14 has pressing member 26 extending from the neighborhood of that side surface of workpiece 24 situated on the side of the base block toward a "far end" side of base block 16 over the upper surface of base block 16. Pressing member 26 is coupled to base block 16 by pin 16a so as to be capable of pivotal movements with its far end portion as a rotation center. Upon the rotation of pressing member 26, the end (hereinafter referred to as "near end") of pressing member 26 situated near the workpiece is moved in the vertical and horizontal directions (i.e. top/down and left/right directions in FIG. 1) relative to the top surface of bed 10 as indicated by two-dot dash and solid lines in FIG. 1. Compression coil spring 28 engages, at its lower end, with the bottom surface of the countersunk portion of the countersunk insertion hole and the upper end of compression coil spring 28 engages with a coil spring receiving recess 28a which is formed at the lower surface of pressing member 26 so as to face the aforementioned countersunk portion of the countersunk insertion hole.

Bolt insertion through hole 30 is provided at the near end portion of pressing member 26 and bolt insertion hole 32 is formed in base block 16 such that it is located coaxial with bolt insertion through hole 30. Pressing bolt 34 (constructed in the manner of a headed bolt) is inserted through bolt insertion holes 30 and 32 with its forward end portion being inserted into inverted T-shaped groove 18 of a table or bed 10 and screwed into anchor member 20 associated with base block 16. When pressing bolt 34 is rotated in one direction so as to move downwardly, the downwardly moving bolt head encourages pressing block 16 to move against force of compression coil spring 28 (i.e., against a force in a direction toward the top surface of base block 16), and hence the near end portion of pressing member 26 is moved downwardly toward the top surface of base block 16 while at the same time near end surface 36 of pressing member 26 comes nearer to that side surface of workpiece 24, which is situated on the side of the base block, into abutting engagement with the side surface of workpiece 24. Since near end surface 36 of pressing member 26 is inclined so that it is far away from the side surface of workpiece 24 situated on the "base block" side when advancing from the upper surface toward the lower surface of pressing member 26, only the upper edge of end surface 36 of pressing member 26 is brought into abutting engagement with the adjacent side surface of workpiece 24, as shown by a solid line in FIG. 1. Therefore, as pressing bolt 34 is rotated in one direction, end surface 36 of pressing member 26 causes a pressure force to act upon the adjacent side surface of workpiece 24 in a downwardly oblique direction so that such pressure force never serves to raise workpiece 24 upwardly thereby sandwiching the workpiece 24 between end surface 36 of pressing member 26 and workpiece positioning recess 22 of stopper 12. Workpiece 24 is clamped by pressing member 26 and workpiece positioning recess 22 of stopper 12 with the aforementioned pressure force so that the workpiece is securely fixed over bed 10. A plurality of grooves 40 are formed on end surface 36 of pressing member 26 and the adjacent side surface of workpiece positioning recess 22 of stopper 12 to prevent slippage from occurring as between the workpiece 24 and end surface 36 and between the workpiece 24 and recess 22.

Pressing bolt 34 defines a countersunk longitudinal insertion hole 38 which is opened at the top surface of the bolt head where large-diameter countersunk recess 41 is located. Rod 42 is inserted into longitudinal insertion hole 38 such that it extends in the longitudinal direction with the forward end portion thereof threadably inserted into the inner end portion of longitudinal insertion hole 38. That end of rod 42 situated on the "open end" side of longitudinal insertion hole 38 is disc-like in configuration to provide display surface 46 with a bright color, such as red or yellow, painted thereon or with a well-reflective color coated thereon. Since, upon the development of a tension stress in pressing bolt 34, rod 42 never undergoes any tension force, the open end or display surface 46 of rod 42 is inwardly moved, within large-diameter recess 41, in a relative fashion.

Figure 2:
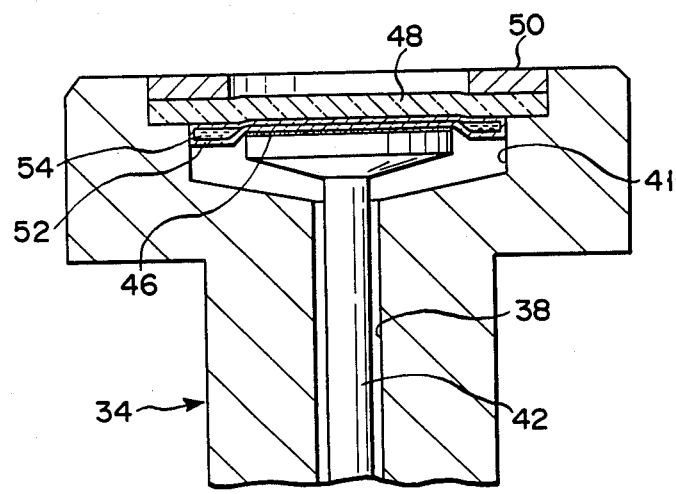
FIG. 2 is a schematic, partial, longitudinal crosssectional view showing one end portion of a pressing bolt on a clamping apparatus of FIG. 1 with a tension stress of over a predetermined level not acting upon the pressing bolt.

The opening of large-diameter recess 41 of insertion hole 38 is covered by a light transmissive window member 48, made of a transparent synthetic resin or transparent glass, as shown in FIG. 2 in more detail. Light transmissive window member 48 is fixed to the open end of insertion hole 38 by annular cover 50.

Between the rear surface of light transmissive member 48 and display surface 46 of rod 42 is located flat bag-like fluid holding member 52 which is made of an elastic, light transmissive material. Within fluid holding member 52 is stored fluid 54 which never passes at least some light wavelength. In this embodiment, fluid 54 is colored dark blue, or dark black, in sharp contrast with the color of display surface 46, and is not of such a type that it colors or discolors the inner surface of fluid holding member 52.

When the open end or display surface 46 is inwardly moved a predetermined distance toward the inner end of insertion hole 38 within large-diameter recess 41 due to the development of a tension stress of a predetermined value in pressing bolt 34, fluid holding member 52 is depressed by the open end or display surface 46 of rod 42 onto, and thus touches, the rear surface of light transmissive window member 48. Since fluid 54 which is colored dark black is discharged into the marginal edge portion of fluid holding member 52 from the location where the aforementioned touching is achieved, display surface 46 of rod 42 can be viewed from the outside through a location where such touching is implemented between light transmissive window member 48 and fluid holding member 52.

Figure 3:
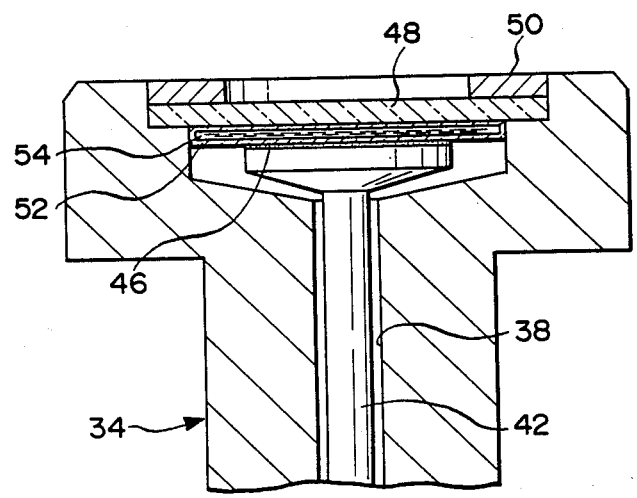
FIG. 3 is a schematic, partial, longitudinal crosssectional view showing one end portion of the pressing bolt of FIG. 2 with a tension stress of over said predetermined level acting upon the pressing bolt.

When the open end or display surface 46 of rod 42 is moved a predetermined distance toward the inner end of insertion hole 38 within large-diameter recess 41, as shown in FIG. 3, due to a tension stress of a predetermined value in pressing bolt 34, the pressure force extended on fluid holding member 52 by the open end or display surface 46 of rod 42 becomes weaker so that the aforementioned touching is released. At this time, fluid 54 (which is colored dark black) is flows from the marginal edge portion of fluid holding member 52 into a corresponding location where display surface 46 is located. As a result, display surface 46 of rod 42 is covered by that fluid, so that display surface 46 of rod 42 cannot be externally viewed through light transmissive window member 48.

There is no possibility that fluid 54 which is held in fluid holding member 52 will contaminate an operator's hand or the neighborhood of pressing screw 34 during the manufacturing, mounting and usage of pressing screw 34 and that fluid 54 will color the rear surface of light transmissive window member 48 and/or display surface 46 of rod 42.

The value of the tension stress loaded onto pressing bolt 34 when the display surface is changed from the viewing state to the nonviewing state at the location of light transmissive window member 48 can be varied by varying the extent to which rod 42 is threadably inserted into the insertion hole bottom portion. Once that extent of the aforementioned insertion is determined, the inner end portion of rod 42 is bonded by means of an adhesive.

When workpiece 24 is clamped over bed 10 with the use of clamping apparatus 14 as set forth above, pressing bolt 34 is rotated in the other direction so as to move the bolt head away from the top surface of base block 16, that is, in an upward direction in FIG. 1. With the movement of the aforementioned bolt head, pressing member 26 is rotated under an urging force of compression coil spring 28 to cause the aforementioned near end portion of pressing member 26 to be moved away from the top surface of base block 16, that is, rotated in a clockwise direction in FIG. 1, so that the end face 36 of pressing member 26 is moved away from workpiece positioning recess 22 of stopper 12 in a horizontal direction to the top surface of base 10, as shown by two-dot chain line. Then workpiece 24 is placed on the upper surface of workpiece positioning recess 22 of stopper 12 and top surface of base block 16 with the lower surface of workpiece 24 down as shown in FIG. 1. Then pressing bolt 34 is rotated in said one direction to cause the bolt head to be moved toward the top surface of base block 16, that is, in the downward direction as shown in FIG. 1. With the movement of the aforementioned bolt head, pressing member 26 is rotated (in the counterclockwise direction in FIG. 1) to cause the aforementioned near end portion of pressing member 26 to be moved against the urging force of compression coil spring 28 toward the top surface of base block 16, so that end face 36 of pressing member 26 is moved toward workpiece positioning recess 22 of stopper 12 in a horizontal direction and into abutting engagement with the adjacent side surface of workpiece 24. With a continued rotation of pressing bolt 34, end face 36 of pressing member 26 causes the adjacent side surface of workpiece 24 to be pressed, in an obliquely downward direction, toward stopper 12. As a result, workpiece 24 which is placed on the upper surface of workpiece positioning recess 22 of stopper 12 and top surface of base block 16 of clamping apparatus 14 is securely clamped by the side surface of workpiece positioning recess 22 of stopper 12 and end face 36 of pressing member 26 on clamping apparatus 14. When the rear surface of light transmissive window member 48 of pressing bolt 34 is covered by fluid 54 in fluid holding member 52 to prevent display surface 46 of rod 42 from being visually viewed, then the rotation of pressing bolt 34 in said one direction is stopped. Such a state in which display surface 46 of rod 42 cannot be viewed through light transmissive window member 48 corresponds to the state in which, due to the action of a tension stress of a predetermined value open pressing bolt 34, a tension strain of a predetermined value is developed in pressing bolt 34 and hence end face 36 of pressing member 26 of clamping apparatus 14 abuts against workpiece 24 under a predetermined pressure force which produces a predetermined clamping force by stopper 12 and clamping apparatus 14 relative to workpiece 24.

Where workpiece 10 is to be clamped over bed 10 with the use of a plurality of clamping apparatuses 14, the fastening operations of all pressing bolts 34 are effected until the rear surfaces of light transmissive window members 48 of all pressing bolts 34 are covered by fluid 54 (a tension stress of a predetermined value acts upon pressing bolt 34). Then if the operator sees if the rear surfaces of light transmissive window members 48 of pressing bolts 34 are covered by fluid 54 in fluid holding members 52 he can determine whether or not a clamping force of a predetermined value acts upon workpiece 24 on the respective clamping apparatus 14.

The aforementioned embodiments are exemplary only and should not be taken as being restrictive to this invention. A variety of changes or modifications may be made without departing from the spirit and scope of this invention.

In clamping apparatus 14, for example, the top surface of base block 16 at a location where workpiece 24 is not placed may be formed into a guide surface portion which so incline that it is far away from the top surface of bed 10 with it being far away stopper 12. The lower surface of pressing member 26 also may be so formed as to have an inclined guide surface, as a slide surface, at a location distant from end face 36. In this way, the slide surface of pressing member 26 can be slidably moved on the guide surface of base block 16, so that pressing member 26 is moved in a vertical direction relative to the top surface of bed 10 with its horizontal movement relative to the top surface of bed 10. In this case, bolt insertion hole 30 of pressing member 26 extends also in the horizontal direction so as not to prevent pressing member 26 from being moved in said horizontal direction and hence, with pressing bolt 34 rotated in one or the other direction, pressing member 26 is movable in said vertical and horizontal directions over base block 16.

Fluid 54 can be held directly within insertion hole 38 of pressing bolt 34 in place of holding it within fluid holding member 52. In this case, fluid 54 is of such a type that it never corrodes, colors or discolors the rear surface of light transmissive window member 48 or rod 42.

If the magnitude of tension stress which acts upon pressing bolt 34 when light transmissive window member 48 is completely covered by fluid 54 is initially set, then it is possible to initially set the depth of the rod insertion hole formed in pressing bolt 34, as well as the length of rod 42. In this case the inner end portion of rod 42 inserted into the rod insertion hole can be bonded by means of an adhesive and pressing bolt 34 can be formed integral with rod 42.

If the inner end portion of rod 42 which is threadably inserted into the inner end portion of insertion hole 38 is projected out of pressing bolt 34, the length of rod 42 in insertion hole 38 can be freely varied by rotating said projection end portion of rod 42 and hence the magnitude of a tension stress, which is loaded on pressing bolt 34 and causes the inner surface of light transmissive window member 48 to be covered by fluid 54, can readily been varied even after pressing bolt 34 has been completed.

What is claimed is:
1. A clamping apparatus for rigidly clamping a workpiece relative to a machine tool bed comprising:
   a base block fixed to the top surface of the machine tool bed;
   a pressing member having an end face located in a horizontally facing position relative to the top surface of the machine tool bed and disposed over the base block so that it is vertically movable relative to the top surface of the machine tool bed so as to positionally horizontally vary said end face relative to the workpiece;
   a pressing bolt coupled to said pressing member and having an open ended longitudinally extending insertion hole, said pressing bolt having another end, opposite to said open end, threadably inserted into the base block and/or bed so the said pressing bolt is movable toward the base block and/or bed when it is rotated in one directon to responsively cause the pressing member to be moved, in said vertical direction, toward the base block and/or bed;
   a rod placed within the longitudinally extending insertion hole of the pressing bolt and having an inner end portion fixed to the pressing bolt such that an end of said rod situated near the open end of the pressing bolt is relatively moved in a direction away from the open end of the pressing bolt toward the other end of said pressing bolt in response to a tension strain being exerted upon the pressing bolt;
   a light transmissive window member fixed to and covering the open end of the longitudinally extending insertion hole of the pressing bolt; and
   fluid holding means provided within said longitudinally extending insertion hole and directly behind a rear surface of the light transmissive window member and having a fluid which does not pass at least one portion of a light wavelength range, said fluid holding means causing a color change to be visibly perceived through said light transmissive window in response to the end of the rod situated on the open end side of the bolt being relatively moved away from said open end side of the pressing bolt in a direction toward the other end of said pressing bolt due to the exertion of a tension strain of a predetermined value upon the pressing bolt, which color change is caused by said fluid flowing into a space between said end of the rod and the rear surface of thelight transmissive window member; and wherein,
   said end of said rod near said open end of said insertion hole is painted with a relatively bright color or a light-reflective color, and wherein,
   said fluid is of a dark color or a light-absorbing color in sharp contrast with the color of said painted end of said rod, and wherein,
   said inner end portion of said rod is threadably inserted into said inner end portion of said longitudinally extending insertion hole of said pressing bolt, and wherein,
   an end portion of said pressing member which is situated distant from said end face of said pressing member is rotatably coupled by a pin to said base block such that when it is rotated relative to said base block, said end face of said pressing member is displaced in said vertical and horizontal directions.

2. A clamping apparatus according to claim 1, wherein said fluid holding means is made of an elastic, light transmissive material and located between said light transmissive window member and said end of said rod such that said fluid holding means is so depressed by said end of said rod on the open end side of said pressing bolt as to be brought into intimate contact with the inner surface of said light transmissive window member, until said end of said pressing rod is relatively moved a predetermined distance from said open end side of said pressing bolt toward the inside of said insertion hole, whereby said fluid is displaced from a location between the end of said rod and the light transmissive window member.

3. A clamping apparatus for positionally clamping a workpiece relative to a bed of a machine tool, said apparatus comprising:

a first base block defining a receiving surface for receiving a portion of said workpiece and adapted to being rigidly attached to the bed of the machine tool;

a second base block;

a pressing member defining a forward end surface at one end thereof and being mounted at another end thereof to said second base block for pivotal movements between (i) a clamping position, wherein said forward end surface is in clamping contact with said workpiece so as to exert a clamping force of predetermined magnitude thereupon and thus positionally hold said workpiece between said forward end surface of said pressing member and said receiving surface of said first base block, whereby said workpiece is positionally clamped relative to said machine tool bed, and (ii) a released position wherein said forward end surface of said pressing member is separated from said workpiece to thereby release said clamping contact between said workpiece and said forward end surface;

said pressing member defining a bore near said forward end surface thereof;

said second base block defining a recess in opposition to a portion of said pressing member rearwardly of said defined bore thereof;

biasing means disposed within said defined recess and acting between said second base block and said portion of said pressing member for exerting a bias force upon said pressing member in a direction to assist its pivotal movement thereof from said clamping position towards said released position;

bolt means for rigidly coupling said second base block to said machine tool bed; and clamping force adjusting/indicating means for permitting said clamping force to be selectively adjusted and for indicating when said predetermined magnitude of said clamping force has been attained, wherein said adjusting/indicating means includes;

(a) a pressing bolt having a head portion and a shank at least a portion of which is threaded, said shank being received within said defined bore of said pressing member and said threaded portion thereof adapted to being threadably coupled to said second base block and/or the machine tool bed such that said head portion thereof is in contact with said pressing member to pivotally move said pressing member between said clamped and released positions in response to turning movements being applied thereto;

(b) said pressing bolt establishing an axially elongate central hole having an open end at said head portion of said pressing bolt;

(c) an indicator rod rigidly received within said elongate central hole and defining an indicator surface at said open end thereof;

(d) a transparent window covering said open end of said elongate central hole;

(e) fluid holding means for containing a substantially opaque liquid between said indicator surface of said indicator rod and said transparent window;

(f) said indicator surface of said indicator rod normally pressing against said fluid holding means when said pressing member is in said released position and thereby effectively causing said fluid to flow to marginal regions within said fluid holding means so that said indicator surface is visibly perceptible through said transparent window;

(g) said indicator rod being relatively movable within said elongate central hole in a direction tending to separate said indicator surface from said fluid holding means in response to a tension force being exerted upon said pressing bolt when said pressing member is pivotally moved from said released position to said clamping position upon turning movement being applied to said head portion of said pressing bolt, which separation tendency of said indicator surface allows said fluid to flow from said marginal regions of said fluid holding means so as to create a fluid layer disposed between said indicator surface and said transparent window to thereby cause said indicator surface to become less visibly perceptible therethrough, which less visibly perceptible indicator surface is indicative of an increase in said clamping force being exerted upon said workpiece by means of said pressing member.

4. A clamping apparatus as in claim 3, wherein said indicator surface includes a painted layer.

5. A clamping apparatus as in claim 3, wherein said predetermined clamping force is indicated by means of said indicator surface not being visibly perceptible through said transparent window.

6. In combination with a machine tool having a bed, a clamping apparatus as in claim 3.

* * * * *